(12) United States Patent
Barker et al.

(10) Patent No.: US 8,803,684 B2
(45) Date of Patent: Aug. 12, 2014

(54) SURVEILLANCE SYSTEM AND METHOD

(75) Inventors: Simon Peter Dudley Barker, Upton Grey (GB); James Becher-Wickes, Esher (GB); Robert Vivian Searles, East Molesey (GB); Elizbeth Clare Wood, Berlin (DE); Keith Alistair Hamilton, Walton-on-Thames (GB); Robert Laurence Searles, Berlin (DE)

(73) Assignee: Cloudview Limited, St Peter Port (GB)

(*) Notice: Subject to any disclaimer, the term of this patent is extended or adjusted under 35 U.S.C. 154(b) by 136 days.

(21) Appl. No.: 13/505,450

(22) PCT Filed: Nov. 19, 2010

(86) PCT No.: PCT/GB2010/002143
§ 371 (c)(1),
(2), (4) Date: Jul. 13, 2012

(87) PCT Pub. No.: WO2011/064530
PCT Pub. Date: Jun. 3, 2011

(65) Prior Publication Data
US 2012/0313781 A1    Dec. 13, 2012

(30) Foreign Application Priority Data
Nov. 26, 2009  (GB) .................................. 0920755.6

(51) Int. Cl.
*G08B 21/00* (2006.01)

(52) U.S. Cl.
USPC ........................................................ 340/540

(58) Field of Classification Search
USPC ................... 340/540, 506, 539.1, 541, 13.24; 348/143, 211.8, 211.11, 207.99
See application file for complete search history.

(56) References Cited

U.S. PATENT DOCUMENTS 6,608,649 B2 * 8/2003 Suzuki et al. .............. 348/211.8
7,533,805 B1   5/2009 Enright et al.
(Continued)

FOREIGN PATENT DOCUMENTS

GB    2430849 A      3/2009
WO  2008127194 A1  10/2008

OTHER PUBLICATIONS

International Preliminary Report on Patentability, Written Opinion and Search Report issued in related PCT/GB2010/002143 application.

(Continued)

*Primary Examiner* — Phung Nguyen
(74) *Attorney, Agent, or Firm* — Brenna C. Swain, Esq.; Jeffer Mangels; Butler & Mitchell LLP

(57) ABSTRACT

A surveillance method and system is provided for receiving image data from a plurality of said cameras; storing the received image data identifying each camera from which the image data originated; enabling each of a plurality of camera users who own or operate respective cameras to assign a said camera owned or operated by the camera user to at least one said set of cameras and to authorize selected users of the system to access image data from said at least one set of cameras, wherein said users of the system can include camera users and/or users not owning or operating any cameras; storing camera set data identifying the assigned camera as belonging to said set of cameras; storing user data identifying the users authorized to access image data from said set of cameras; and outputting image data to users dependent upon said camera set data and said user data.

27 Claims, 6 Drawing Sheets

(56) References Cited

U.S. PATENT DOCUMENTS

| | | | |
|---|---|---|---|
| 2003/0202101 A1 | 10/2003 | Monroe | |
| 2003/0206232 A1 | 11/2003 | Suzuki et al. | |
| 2005/0132414 A1* | 6/2005 | Bentley et al. | 725/105 |
| 2006/0146122 A1 | 7/2006 | McDonald | |
| 2006/0242679 A1* | 10/2006 | Hutchison et al. | 725/105 |
| 2007/0268121 A1* | 11/2007 | Vasefi et al. | 340/506 |
| 2008/0048861 A1* | 2/2008 | Naidoo et al. | 340/541 |

OTHER PUBLICATIONS

Written Opinion and International Search Report dated Feb. 25, 2011, issued in related PCT Appl. No. PCT/GB2010/002143.

* cited by examiner

SURVEILLANCE SYSTEM AND METHOD

FIELD OF THE INVENTION

The present invention generally relates to a surveillance system and method for use on a network such as the internet.

BACKGROUND OF THE INVENTION

Surveillance cameras have become ever more prevalent in society for people looking for enhanced security. Closed Circuit Television (CCTV) has been available for many years but suffers from the requirement for it to be manually monitored if the images are to be used real time, otherwise it simply acts as a recordal system.

With the advent of the internet and Internet protocol (IP) enabled cameras it has become possible for people to control and access images from cameras acting as Surveillance cameras over the Internet. Although such systems benefit from accessibility anywhere in the world, they require manual intervention to access and monitor the images generated. Further, people are generally required to monitor their own cameras and do not have knowledge of or easy access to images from other people's cameras.

The present invention aims to provide an improved surveillance system and method. The term surveillance in this application covers any observation or watching from a distance for whatever purposes and is not restricted to surveillance for security or safety purposes.

SUMMARY OF THE INVENTION

In, one aspect the present invention provides a surveillance system comprising receiving means for receiving image data from a plurality of cameras; image storage means for storing the received image data identifying each camera from which the image data originated; management means for enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras; information storage means responsive to said management means for storing camera set data identifying the assigned camera as belonging to said set of cameras, and for storing user data identifying the users authorised to access image data from said set of cameras; and image interface means for outputting image data to users dependent upon said camera set data and said user data in said information storage means.

Another aspect of the present invention provides a surveillance method comprising receiving image data from a plurality of cameras; storing the received image data identifying each camera from which the image data originated; enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras; storing camera set data identifying the assigned camera as belonging to said set of cameras; storing user data identifying the users authorised to access image data from said set of cameras; and outputting image data to users dependent upon said camera set data and said user data.

These aspects of the invention enable communities of cameras and users to be set up under the control of the community of users. Users and cameras can belong to zero or more communities. The cameras being grouped together in sets enables images from the set of cameras to be shared amongst the users who are authorised to access the set i.e. the users who are part of the community. The authorisation can be automatic or based on a response to a request from a user. The community of users and set of cameras available to the community is dynamic and the functionality available to the users in the community can be different dependent upon a security model that allows various access levels. In such a community not all users need own or be in control of cameras. They do not thus contribute to the library of images. Instead, they can simply access the images and be sent notifications or alerts when new images are available subject to the camera owner's authorisation.

In this invention the image data can comprise still images or video images and can include audio. Still images have a lower data size than video images and are hence better suited to networks with lower bandwidth e.g. an upload link of an ADSL line.

In one embodiment, the management means is adapted to enable users owning or operating respective cameras to enter camera user data as part of said user data to identify said users as authorised to access image data from said respective cameras.

One embodiment includes alert means for generating an alert for transmission to a user when images are received in said image storage means. Thus in this embodiment, images can be uploaded from cameras periodically for many reasons e.g. images are taken a set time intervals, or when an event occurs and thus for each image or group or set of images uploaded an alert can be generated to warn the user or a designated other user that there are new images to view.

In one embodiment, the receiving means is adapted to receive said image data comprising at least one image the capture of which by said camera was triggered by an event; the system including image data processing means for processing the image data for said at least one image to identify if said at least one image relates to a previous event, and if said at least one image relates to a previous event, to link said image data to said previous event and to image data identified to belong to the previous event, and if said at least one image is not identified as relating to a previous event, to link the image data to a new event; wherein image interface means is adapted to output said image data to said users on an event by event basis. Thus in this embodiment, images that are determined to be captured as a result of the same event can be associated with one another for output together. The images can be captured by different cameras but relate to the same event or images from the same camera captured at a later time may be determined to relate to the same event.

One embodiment includes alert means for generating an alert for transmission to alert a user of an event, said alert means being adapted to generate an alert signal when said image data is linked to a new event. In this embodiment, an alert is not generated for every new image or group of images received. An alert is only generated when it is determined that received images relate to a new event In one embodiment, the management means is adapted to enable users owning or operating respective cameras to enter alert data as part of said user data to identify at least one user authorised to access image data from said cameras to receive said alerts for images received for said respective cameras; and said alert means is adapted to generate said alert in dependence upon said alert data in said information storage means.

This enables users to set up their desired alert types, the alert messages and even the user to whom the alert is to be sent since it is not necessary for the alerts to be sent to the user that owns or controls the camera. It is possible for the alert to be sent to multiple users in a community.

One embodiment includes a camera monitoring means for periodically monitoring said cameras to check that a response is received from each said camera. One embodiment includes camera alert means for generating an alert signal for transmission to alert a user if a camera fails to respond.

In one embodiment, the management means is adapted to enable users owning or operating respective cameras to enter camera location data as part of said user data, the system including map means for displaying a map showing the locations of said cameras on said map to said users in dependence upon said camera set data and using said user data.

In one embodiment, the map means is adapted to allow a user selection of the location of a said camera, and said image interface means is adapted to output image data to users for a said camera corresponding to a said selected camera location in dependence upon said camera set data and said user data.

In one embodiment, the map means is adapted to display the locations of all said cameras, and to display the locations of cameras in a said set of cameras differently to cameras not belonging to said set of cameras in dependence upon said camera set data and said user data.

In one embodiment, the map means is adapted to indicate if there is new image data for each camera at each location, where new image data is image data that has not yet been output by said image interface means. The new image data can simply be image data that has not yet been viewed i.e. unread data. Alternatively or in addition the image data can have a time element associated with it that changes the status of the image data from being 'new' after a predetermined period of time. This in this way, the 'new' status indicates only recent images.

In one embodiment, the map means is adapted to determine a boundary of the map based on the locations of said cameras to be displayed on said map.

In one embodiment, the map means is adapted to display a plurality of said camera locations as a single camera cluster location if the locations of said plurality of cameras are within a threshold.

The map functionality provides a graphical user interface for users to manage their user accounts, cameras, and communities in a simple and intuitive manner and to gain knowledge of and easy access to images for cameras owned by other users.

The present invention can be implemented in the software or in a combination of software and hardware. The present invention thus encompasses a computer programme provided as a computer programme product on a carrier medium which can include a storage medium and a transient medium or signal. The computer programme can be stored on a storage medium such as a solid state memory, an optical disc, a magnetic disc, or tape device. The computer programme can be provided on a transient medium or signal in the form of an optical signal, acoustic signal, magnetic signal, radio frequency signal, or electrical signal such as a TCP IP signal over the internet.

DESCRIPTION OF SPECIFIC EMBODIMENTS

An embodiment of the present invention will now be described with reference to FIGS. 1 to 7.

Figure 1:
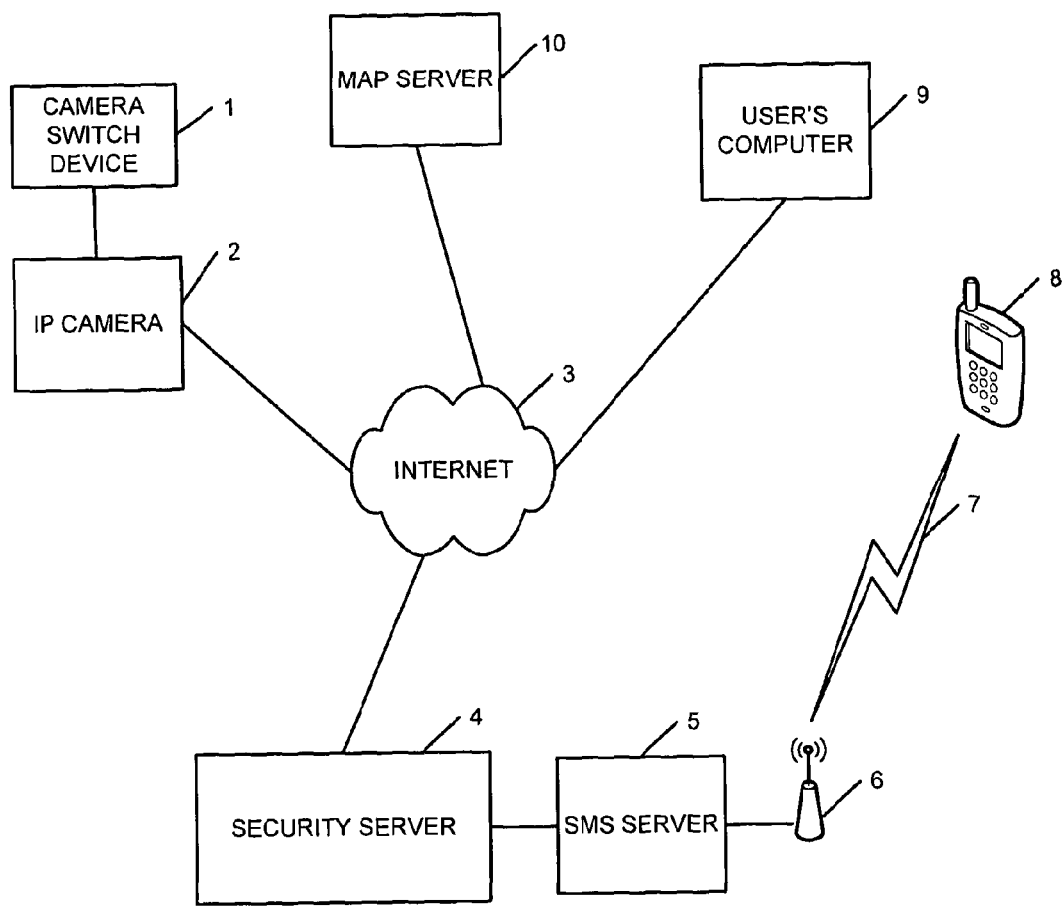
FIG. 1 is a schematic diagram of a surveillance system in accordance with one embodiment of the present invention.

FIG. 1 illustrates a surveillance system providing a surveillance service. An internet protocol (IP) camera 2 is provided connected to the internet 3. Although only one IP camera 2 is shown in FIG. 1, in practice there will be many cameras connected and operated by many different users: some users operating more than one camera. The IP camera 2 operates to capture images based on a trigger event. Such cameras are known in the art and provide for the capture of an image ready for remote accessing over the internet or upload to a remote server. Thus the IP camera 2 includes memory for the storage of images captured as a result of trigger events.

The IP camera 2 is provided at a location at which surveillance is required. A number of such IP cameras 2 can be provided in a building or in an area to provide for complete surveillance. Such IP cameras 2 can be owned by a single entity or different entities can own different sets of IP camera 2 to provide surveillance for different regions.

The IP camera 2 can be triggered to capture an image based on an external trigger event from a camera switch device 1, or by an internal recognition process. The camera switch device 1 can comprise any device which will trigger based on an event.

For example, the camera switch device 1 can comprise a passive infrared (PIR) device to sense body heat movement in a region in the field of view of the IP camera 2. Alternatively, the camera switch device 1 can comprise a simple switch on a door or window for example to detect the opening or movement of the window. The camera switch device 1 can alternatively comprise a shock sensor, a contact sensor, a pressure sensor, a heat sensor, or a light sensor. As an alternative to using the camera switch device 1, the IP camera 2 can be equipped with software to detect an event based on changes in images e.g. a change in an object or movement of an object between image frames, a change in lighting conditions, or a change in colour. Further, the trigger event can be a personal panic alarm used by a person to manually trigger an event.

This embodiment of the present invention is applicable to a surveillance and monitoring system applied for many reasons, not just for security i.e. theft or vandalism, but also to warn of hazardous conditions e.g. fire or chemical spills. In fact any event for which surveillance is required can form the basis of the triggering of image capture.

In addition to capturing still or video images, the camera 2 may be capable of recording audio accompanying the images. The audio is associated with the image data captured by the camera 2.

FIG. 1 also illustrates the connection of a security server 4 to the internet 3. The security server 4 provides the principle functionality of the surveillance system. In conjunction with the security server 4, a short message service (SMS) server 5 is provided along with an SMS transmission arrangement 6 to provide the ability to transmit SMS alert messages over a wireless communication channel 7 to a mobile device 8 in the possession of a user. The SMS server thus enables alert messages to be transmitted by SMS to users.

Users can also connect to the security server 4 over the internet 3 using a user's computer 9. The user's computer 9 will be equipped with a conventional web browser and email client to enable a user to receive email alert messages if the user has elected to receive alerts via email in addition to or instead of by SMS message. The browser enables the user to connect to the security server 4 to access management functions provided therein.

Alerts can be sent by any convenient means of communication and can include the Multimedia Message Service (MMS), or a social network service such as Twitter™ or Facebook™.

Also shown in FIG. 1 is a map server 10 connected to the internet 3. The map server 10 can be provided by for example Google Maps™ functionality. The map server provides dynamically accessible and manipulatable maps that the security server 4 can access and interact with to provide the user of the user's computer 9 with images showing the location, functionality and network membership of IP cameras 2. This functionality and the concept of network membership will be described in more detail hereinafter with reference to FIGS. 5 to 7.

Figure 2:
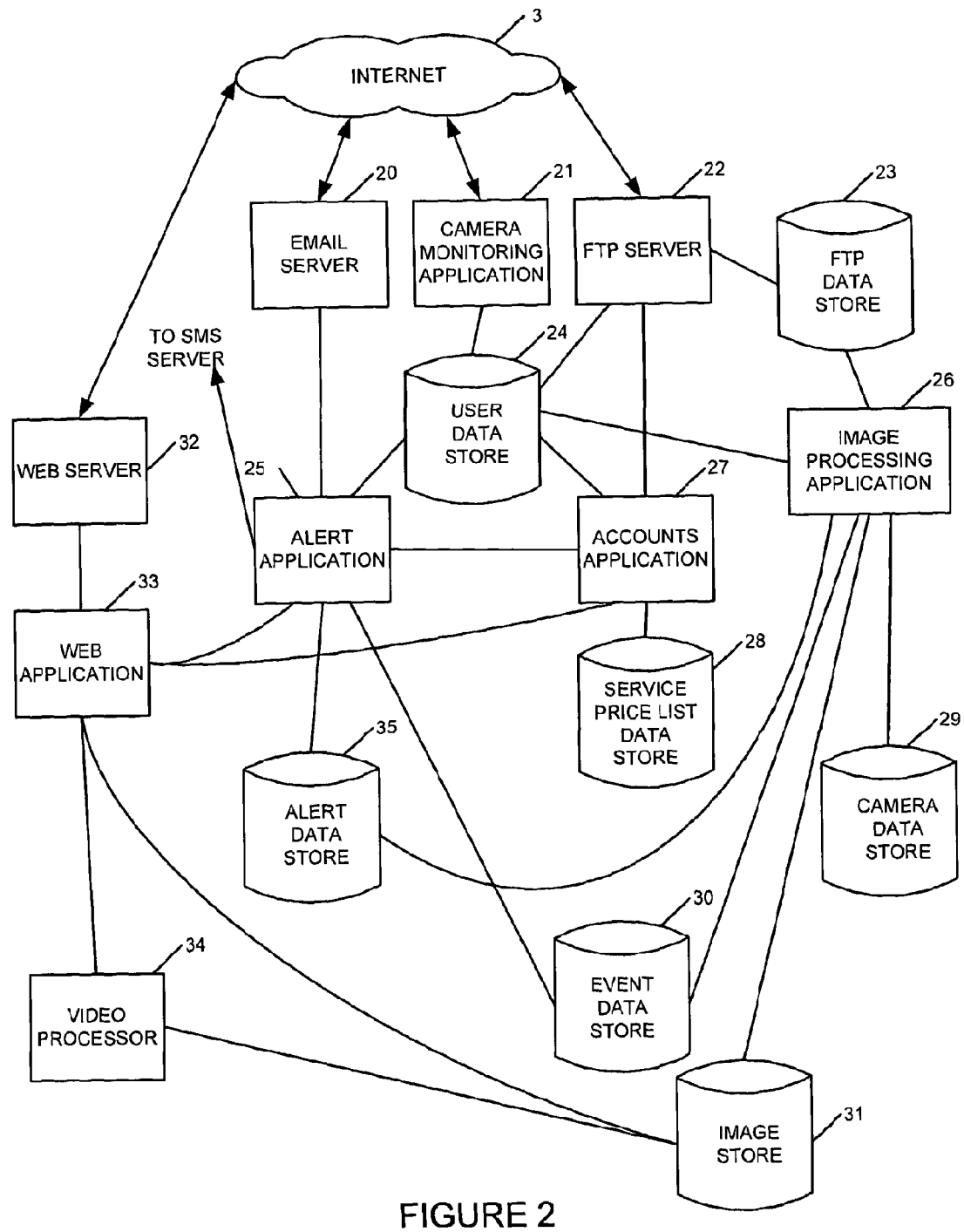
FIG. 2 is a schematic diagram of the security server of the embodiment of FIG. 1.

FIG. 2 illustrates the structure of the security server 4 in detail. In this embodiment the security server can comprise one or more server machines providing the functionality illustrated in FIG. 2.

An FTP server 22 is provided connected to the internet 3 for connection with IP cameras 2 to upload image data for storage in an FTP data store 23. The FTP server is connected to an accounts application 27 in order to identify IP cameras 2 to connect to. The accounts application 27 stores, accesses and processes user data stored in the user data store 24. The user data includes user information such as user name and password, contact details, including email address. Also information on the cameras owned by the user is stored. This data includes information identifying the cameras such as the make and model as well as location information identifying the location of the cameras. Also each camera is given a user name and ID by the user to enable the FTP server 22 to connect to the camera to upload the images. Information on the cameras can also include information on any cameras which are set in a disabled state. This enables a user to disable certain cameras to avoid alerts being triggered unnecessarily e.g. when building work is being carried out at a location or some other activity is taking place that would normally be construed by the IP cameras 2 and their respective triggering arrangements to constitute an event. Also in the camera data there can be data set by the user defining when certain cameras are active and inactive. For example, a user may set a certain IP camera as being inactive during the day when the user is present at a location. The camera will thus only be considered by the surveillance system to be active at the prescribed times set by the user in the user data. Also, information identifying sets of cameras or networks is stored. Data for each camera can identify the set or network that the camera belongs to. The camera can belong to more than one set or network. This can be defined by the user i.e. the owner or operator of the camera. The user data also specifies which sets or networks the user belongs to. In this way it can be defined in the data sets or networks of cameras to which users can have access. This will be described in more detail hereinafter.

Other data held in the user data store 24 includes accounts data. This includes payment information e.g. credit card information together with information on the current credit, bandwidth and service usage. The accounts data can also include information indicating the service plan subscribed to by the user, where different service plans and charging arrangements are available to users.

The user data can also include log data recording usage of the service by a user such as recording details of uploaded images, deleted images, user log-in times and activities etc.

The user is able to set alert types and parameters as will be described in more detail hereinafter and thus the user data stores details of the user's preferred alert types and alert parameters e.g. alert message content and alert times.

Also shown in FIG. 2 connected to the accounts application 27 is a service price list data store 28. As mentioned above, a user may choose a particular service plan and thus the accounts application 27 will apply price parameters from the particular price list associated with that plan based on the data in the service price list data store 28.

A camera monitoring application 21 is provided connected to the internet to periodically check with IP cameras 2 that they are connected and functioning. In order to be able to perform this function the camera monitoring application 21 is connected to the user data store 24 to access camera data to identify the cameras to be contacted and the camera user's name and ID to enable connection to the cameras for testing.

An image processing application 26 is provided for processing the images uploaded and stored in the FTP data store 23. The image processing application 26 will perform the date and time conversion process for images as well as the event recognition process as will be described in more detail hereinafter with reference to FIG. 3. The image processing application is connected with a camera data store which stores data on camera types to enable the date and time conversion. Also an image store 31 is provided connected to the image processing application 26 for the long term storage of image data for the images for access by a user either as a sequence of images for an event or as individual images.

An event data store 30 is provided connected to the image processing application 26 to store details of an event. The event data store can store data linking images as well as information identifying the particular event if available. Such information may be passed in meta data with images from the IP cameras 2 and their associated camera switch device 1.

An alert application 25 is provided to monitor the event data store 30 and to generate alerts for users in accordance with a user's alert requirements which are stored in the user data store, and in dependence upon the status of their account determined by the accounts application 27. The alert application 25 stores alert data in an alert data store 35. The alert application can generate an alert in accordance with the user's requirements either as an SMS message which is sent to the SMS server 5, or as an email which is sent to email server 20 for the transmission of an email to the user's computer 9. In one embodiment the SMS server 5 can also support the use of MMS and a social network connection such as a Facebook™ or Twitter™ connection to enable alerts to be sent to users such as "Tweets". An alert can also be generated simply as an alert which is held in the alert data store which will be visible to a user next time they access the security server to view their management data.

The security server 4 is also provided with a web server 32 connected to the internet to allow a user to connect to a web application 33 providing a range of management functions. The web application provides access to the alert application 25 and the accounts application 27 as well as the image store 31 and a video processor 34. The web application 32 can provide access to the images by retrieving and rendering map data from the map server 10 based on camera location information for image data to be displayed to users. The map data can be overlaid with location indicators such as icons to indicate the location of the cameras capturing images and to allow the viewing of the images by the selection of the camera location. This will be described in more detail hereinafter.

The web application 33 can be provided in multiple forms dependent upon the form of access required. For example, a mobile web application can be provided to provide the same functionality for users accessing via a mobile communications link.

The video processor 34 is provided to access images in the image store 31 in accordance with data in the event data store 32 and to stitch together or can concatenate images in a temporal sequence for viewing by a user accessing the web application 33 or for downloading or forwarding by a user. Thus a video processor 34 can sequentially and temporally link still images together to form a video image for images related to an event for viewing by the user using the web application. The video processor 34 can also sequentially connect together video images for video images determined to relate to the same event.

Thus as can be seen in FIG. 2 images can be uploaded to the server and stored to be accessible on an event basis and alerts can be generated to a user for every new event determined to take place. The user can respond to the alert to connect to the web application to view the images for an event.

Although in FIG. 1 the IP camera 2 and the user's computer 9 are shown connected to the Internet in a wired manner, the IP camera 2 can be connected to the internet 3 in a wireless manner as is commonly available for IP cameras. The wireless link can take the form of a local wireless link e.g. WiFi, or a global wireless link e.g. WAP or 3G. Similarly, the user computer 9 can be connected in a wireless manner and indeed the user's computer 9 can comprise a PC, or a handheld device such as a mobile telephone having internet capability, often termed a Smart Phone. Thus a user operating such a Smart Phone can receive either an email or a text message alert notification of a surveillance event and they can access the images associated with that event from the same device by connecting to the mobile version of the web application 33. The invention is also not limited to the Internet and is applicable to any IP network or indeed any network of cameras, users and a security server.

The web application 33 also enables various management functions with regard to the alerts and accounts as will be described in more detail hereinafter.

The process of uploading images and generating alerts will now be described with reference to FIGS. 3 and 4.

Figure 3:
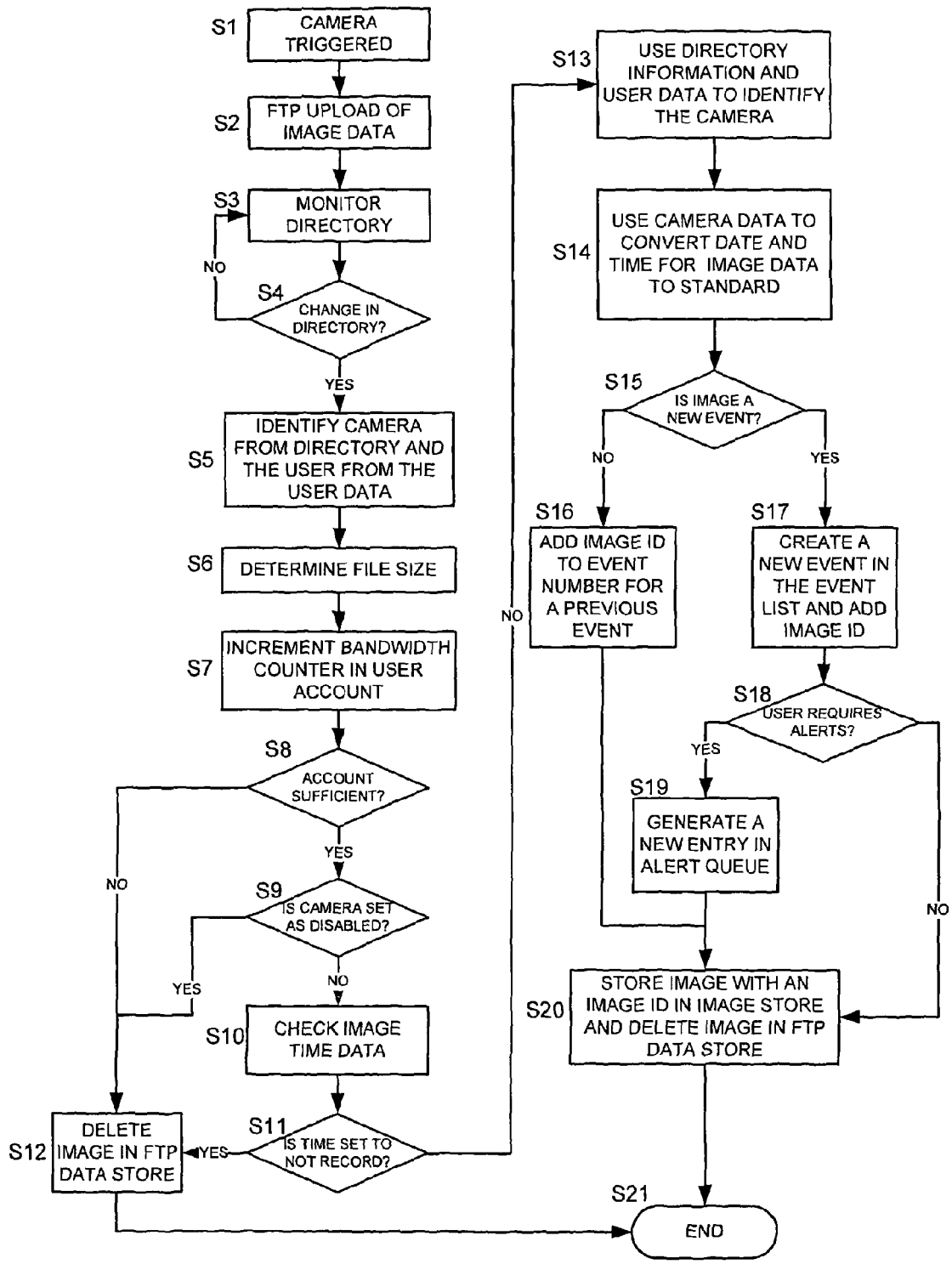
FIG. 3 is a flow diagram illustrating the surveillance method in accordance with one embodiment of the present invention.

In FIG. 3 when an event occurs, an IP camera 2 is triggered to capture an image or a series of images. The image is stored within the IP camera 2 until a connection is made with the FTP server 22 for the FTP upload of the image data (step S2). The FTP server 22 receives the image data and stores it in the FTP data store 23. In the FTP data store 23 the storage of the image data files is structured using directories. Each camera is assigned a sub-directory. Image data files received from each camera need to be stored in the appropriate camera directory. In order to achieve this, the FTP server 22 accesses information on cameras in the user's data store 24. The FTP server 22 is able to identify the camera for which the image data is received and to store the image data file in the correct directory. The FTP data store 23 simply acts as a temporary repository for uploaded image data files, wherein the image data files are stored in a directory structure identifying the camera.

The image processing application 26 monitors the directory structure of the FTP data store 23 (step S3). If there is any change in the contents of the data structure i.e. if there are any uploaded image data files (step S4) the image processing application 26 identifies the camera from the directory (step S5) and uses the camera data to identify the user using the user data in the user data store 24. Then the file size of the image data file is determined in step S6. From the identification of the user in step S5 and the size of the file determined in step S6, the user data store 24 is accessed by the image processing application 26 to increment the bandwidth counter indicating the amount of bandwidth utilised by the user in the user account.

In this embodiment of the present invention the service model utilised by the user requires payment based on the amount of bandwidth used in uploading the image data files. Thus in step S8 it is determined whether the user has sufficient credit for the bandwidth used to upload the image data files. If not, in step S6 the image processing application 26 deletes the image in the FTP data store 23. The process then ends in step S21.

In this embodiment of the present invention, a user can set up data in the user data to trigger the sending of a warning if their credit falls below a threshold. For example, a first warning is sent for example by email if the credit falls below a first threshold and a second warning is sent by for example SMS message if the credit falls lower and below a second threshold. This reduces the chance of a user unintentionally losing images due to low credit.

If the user does have sufficient credit for the bandwidth utilised by the uploaded image data file (step S8), in step S9 it is determined whether the user has set the IP camera 2 as being in a disabled state. The user data store 24 includes data in the set of camera data on whether or not the camera is set as being disabled by the user. If the camera is set as being disabled, in step S12 the image data in the FTP data store is deleted and the process ends in step S21.

If it is determined by the image processing application 26 using the user's data in the user data store 24 that the camera is not set as being disabled (step S9), the image processing application 26 then looks at temporal data associated with the image data file to check the date and time that the image was taken (step S10). In step S11 the image processing application 26 then looks up the camera data in the user data store 24 to determine whether the user has set the time for the camera to be inactive and if so whether the time of the image taken by the camera matches a time set by the user for the camera to be inactive (step S11). If the time that the image was taken matches a time set by the user for the camera to be inactive (step S11) in step S12 the image data file in the FTP data store is deleted and the process terminates in step S21.

The process then moves on to formatting the temporal data associated with the image data file into a standard format. In step S13 the directory information in the FTP data store 23 and the user data in the user data store 24 is used to identify the camera type. The directory information identifies the camera by the directory. The user data store 24 stores data for each user identifying the cameras and including the camera type information e.g. the manufacturer and model. Thus in step S13 the manufacturer and model of the camera can be determined. In step S14 this data is used by the image processing application 26 to convert the date and time information for the image data to a standard common date and time format. This standard format can then be used for comparison with other images which may have been taken on other cameras.

The process then moves on to event determination using this standard common time format as a means of identifying in this embodiment whether an image is associated with a previous event or a new event. In step S15 this determination is made based on whether or not the time and date are within the pre-determined threshold for a date and time of previously stored images. Thus in this embodiment a grouping of images is based on temporal information in the images for a camera and it is assumed that if the time that the images were captured is close enough, they relate to the same event. In an alternative embodiment, it is also possible to group image data for any of the cameras for a user as relating to the same event if the time that the images were captured is close enough and if the trigger for the taking of the images is associated with the cameras. This assumes that the cameras are in close geographic proximity. Where cameras owned by a user are arranged across a considerable geographic distance, the determination of whether images relate to the same event can also take into account the geographic location of the cameras. This information can be stored in the user data store 24 as part of the camera data.

If it is determined that the image does not belong to a previous event (step S15) in step S17 the image is given an ID, and a new event is created in the event list to which the image ID is added. Since a new event has been created in the event list in step S18 it is determined whether the user has set their preferences to indicate that they wish an alert to be generated (step S18). If so a new alert is generated and entered into the alert queue in step S19. If not, the image is stored with the image ID in the image store 31 and the image in the FTP data store is deleted (step S20).

If in step S15 it is determined that the image is part of the previous event, in step S16 an image ID is assigned to the image and it is added to the event number for the previous event to which the image is identified as belonging. The process then proceeds to S20 where the image is stored with the image ID in the image store 31 and the image in the FTP data store 23 is deleted. Thus in steps S16 and S17 the event data in the event data store 30 is updated with either a new event and an associated image ID or a previous event is updated with the image ID.

After storing the image in the image data store 31 and deleting the image in the FTP data store 23 in step S20, the process terminates in step S21. The image data is thus available in the image data store 31 for accessing by a user in response to an alert generated by the alert application 25.

The process of alert generation will now be described with reference to the flow diagram of FIG. 4.

As described with reference to FIG. 3, for each new event determined in step S17, in step S19 a new entry is generated in the alert queue. Thus, in the alert data store 35 for a multiplicity of users, alerts can build up in the alert queue.

Figure 4:
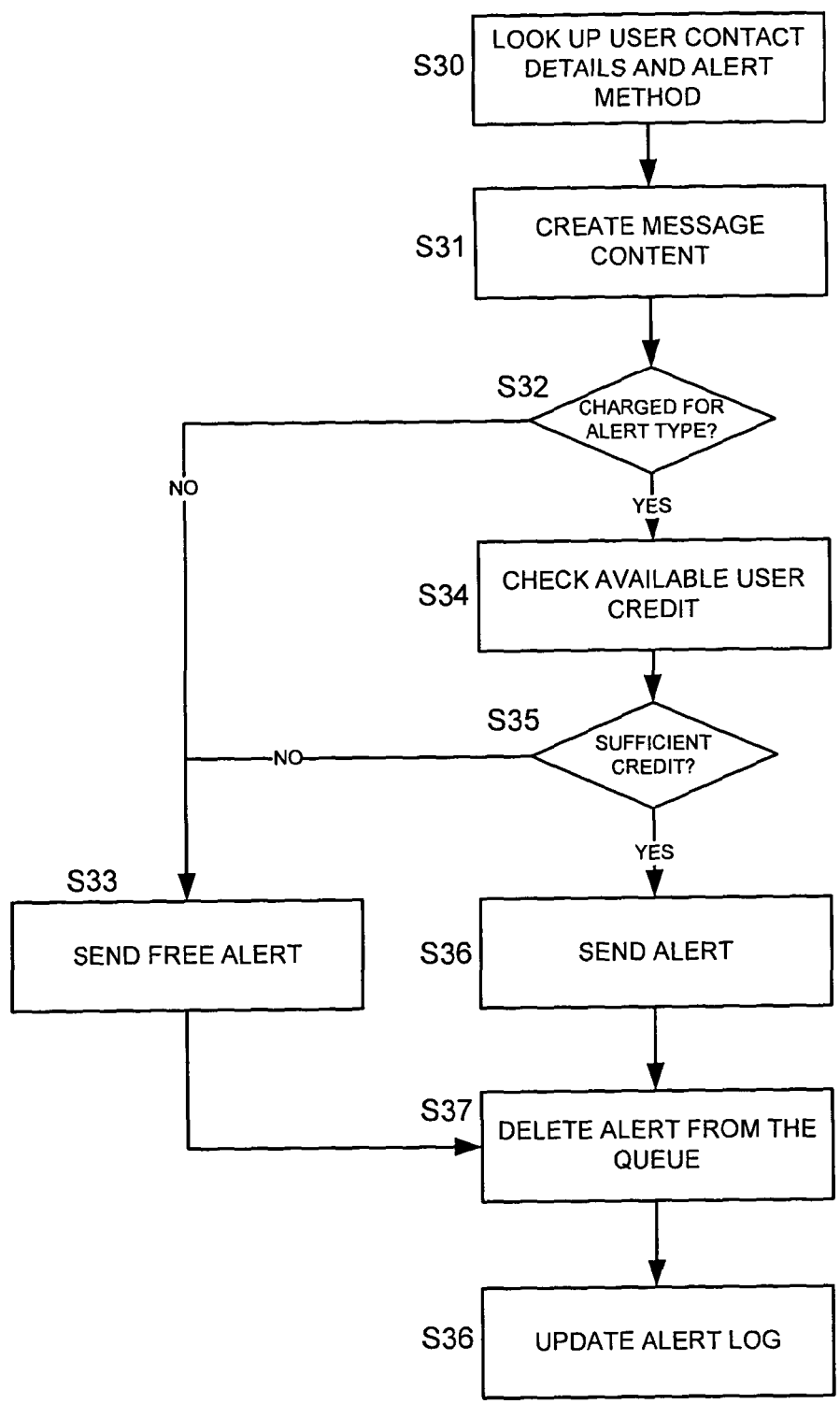
FIG. 4 is a flow diagram illustrating the method of generating an alert to users in the embodiment of FIG. 3.

FIG. 4 thus describes the processing of the alerts in the alert queue. The alert entry in the alert queue will identify the user. In step S30 the contact details and alert method for the user is looked up in the user data store 24. The alert method in the user data store 24 will define the type of alert and the format of the alert preferred by the user. For example, the alert type can be by SMS, email, or simply as a web notification when the user logs in to the website. The message content of the alert can be standard for each type of message or the user can tailor the messages to meet their needs in accordance with data stored in the data store 24. Certain alert types, e.g. email, can be designated as free and other alert types, e.g. SMS messages, can have a cost associated with them.

The user data store 24 can also store data identifying the intended recipient of alerts. A user can set up their preference such that all alerts are sent to one or a number of other users e.g. members of their network or networks. The user can set up such alert preferences based on date and time parameters e.g. between 9 am and 5 pm a first user will receive the user's alerts and at other times a second user will receive the user's alert's. Such alerts can be in addition to the user receiving the alerts. The user may receive one alert type and the first and second may receive another alert type.

In step S31 the message content is created and in step S32 it is determined whether a user has selected an alert type that has a cost associated with it e.g. an SMS message. If a user has selected an alert type that does not have a cost associated with it e.g. an email, in step S33 the free alert is sent and the process proceeds to step S37 where the alert is deleted from the queue and then in step S38 the alert log is updated. If the user has selected an alert type with a cost associated with it (step S32), using the user account data in the user data store 24 the available credit for the user is checked in step S34. In this embodiment of the present invention, users are charged for each alert that incurs an alert cost and thus the user must have credit for these types of alerts. If the user has insufficient credit (step S35), only a free alert is sent in step S33 and the process proceeds to step S37 where the alert is deleted from the queue and then in step S38 the alert log is updated. One reason for charging for alerts is that there is some cost associated with generating the alerts for example sending an SMS message.

If the user has sufficient credit for an alert (step S35) the alert is sent in accordance with their preferred alert type in step S36 and the alert is deleted from the alert queue in step S37. Then the alert log stored in the alert data store 35 is updated in step S38.

So far the operation of the system for capturing images from cameras and storing them related to events, as well as generating alerts for new events has been described. The method of accessing images, managing images and managing data using the web application 33 will now be described.

The web application 33 has access to all of the data in the alert data store 35 and the user data store 24. Also images in the image store 31 can be accessed.

The web application 33 provides an interface in the form of an inbox in which events are identified together with their associated images as a linked series of images e.g. video, or as individual images. In this embodiment all images captured are associated with events.

Using the inbox, the user can select to view an event which enables a user to view information about the event e.g. the time the event took place, the cameras involved, the location of the cameras, and other information, where available such as the reason for the triggering of the event or the taking of the images. Events which have been accessed can be indicated on the display differently to events which have not yet been accessed by the user. The user is able to select to view the images for events and to permanently store images in folders on the security server or on the user's computer. Images can be downloaded to the user's computer or forwarded. Similarly videos can be downloaded or forwarded. Also notes can be attached to individual images or to the whole sequence of images for an event. Events within a user's inbox can be deleted and this results in the associated images also being deleted. Thus the user must permanently store images in folders to manage their inbox.

The user's inbox comprises of one or more sub-inboxes, each of which relates directly to one of the user's cameras. All incoming events for each camera are displayed in a sub-inbox for that specific camera. The latest events are also displayed in a separate sub-inbox thus allowing the user to view the recent activity of all the user's cameras or that of the cameras which are cameras of networks of which the user is a member, at a glance.

Using the functionality contained within the inbox, the user can then create folders and sub-folders within which to save any of the events, or any component part of that event, displayed in any of the sub-inboxes, or to delete them. Additionally, there is another folder allowing the user to see which events the user has emailed direct from the system, or shared via social networking sites such as Twitter or Facebook.

Additional functionality is provided by the system for viewing sub-inboxes for each of the networks of which the user has become a member, in which are displayed the events relating to the respective networks. By saving these events to one of the user's folders or sub-folders, the user can manipulate any of the events so displayed as if they had been the user's own events displayed within the user's own sub-inboxes.

However, a user, when authorising membership to any network for which he is the network administrator, may decide which members of that network the user wishes to restrict in their capability to manipulate events, delivered to them as a result of their being a member of that network. In this way, the user may decide that another user cannot email, download, save into an inbox or post as a forum or private messages any event delivered to that other user as a result of that other user being part of the user's network.

A user may also decide to allow access by other users of the system to certain events, either the user's own or events delivered to that user by way of membership of another network, by attaching that event, or a component part of that event, to a forum message or to private messages directed at one or more of the system's users. Any private messages received by the user are shown within a private message inbox.

In this way, no user is able to gain access to any events to which they are not fully entitled to have such access.

A user is able to set up a network in which a number of cameras can be associated to the network and a number of users can be permitted to access the network. A network can be considered as a community. Thus a number of cameras are associated as a set of cameras to the network. Cameras can belong to more than one network i.e. more than one set of cameras. The users can be assigned different permissions in the network. The user who set up the network can be given administrator permissions. Other users can have lesser permissions. Thus in this model images taken from cameras are associated with cameras and associated to users who are the owners or operators of those cameras. Also the images, cameras and users can be associated with zero or more networks i.e. sets of associated users and cameras. In this way images can be shared between users and between cameras. Not all users need have cameras under their control or ownership. Thus some users do not contribute any images to the "community" of the network to which they belong. They simply provide a monitoring function. This type of functionality is suited to for example a "neighbourhood watch" scheme wherein a neighbourhood acts together to increase vigilance to try to reduce crime in the neighbourhood. In such a scheme users who have cameras can set up and join a network so that other users can share and access images from other user's cameras. Even users without cameras can join to access images from neighbours' cameras dependent upon the permissions given. Alerts can be generated for a network to be directed to all users of the network, or only certain users of the network dependent upon permissions set. In this way the community of users can share security images and share the burden of monitoring the images from the cameras when events occur.

This model of a community based network of cameras is based on the principles of associating images with cameras, cameras with users, users with networks, and cameras with networks. Cameras and users can belong to more than one network independently. For example, a user belongs to one network but does not permit images from any of the user's cameras to be shared with that network. In this case, the user simply acts as a monitor. In another example, a user joins a network and shares all images from all cameras with other users in the network. Of course, users can share only some cameras with a network. Thus, users can belong to zero or many different networks and cameras can belong to zero or many different networks.

The interface provided to the user also provides a management interface to enable management of the data in the alert data store 35 and the user data store 24. The user can access user contact details in the user data store 24 to input and update contact details including their e-mail address and mobile telephone number for receipt of alerts. The user's account data in the user data store 24 can also be accessed to enable a user to select a service type where the system offers different types of services, usually based on different pricing models. Also payment information, credit information, and transaction history information can be viewed. The interface also allows a user that owns or operates cameras to enter certain data for their cameras. The data will include the type of camera, a user name and ID of the camera to enable access to the images by the FTP server, location information for the camera and identification of the networks, if any, to which the camera needs to belong (i.e. the sets of camera to which the camera belongs). Also a user can set up a camera's status as disabled so that when any images are uploaded they are ignored (see step S9 in FIG. 3). Further, a user can set a camera to be disabled only at certain times e.g. between 9 am and 5 pm so that images during this time are ignored (see step S11 in FIG. 3).

The user interface also enables a user to set parameters for the alerts such as the preferred type of alert such as SMS, e-mail, MMS or a social network service such a Twitter or Facebook. Further, the message format or content of an alert can be set. Also a user can set preferential times of delivery of alerts. For example, a user may wish alerts to be delivered twenty-four hours of the day. Alternatively a user may wish alerts not to be delivered between the hours of 11 pm and 6 am. Further, the user can set up the user(s) to whom the alerts are to be sent.

The user interface also allows a user to set up a new network i.e. to define a new set of cameras and users. Generally the author of a new network will have administrative rights over that network and they can invite users to join the network. The invitations will take the form of messages sent from the user's inbox to other user's inboxes. Alternatively they may receive requests to join the network or to view images from a specific camera in a network from a user who is not a member of the network. The user setting up the network can assign zero or more of their cameras to the network and can assign any number of users as having allowed access. Recipients of the invitation can accept the invitation to join the network as users, and set zero or more their cameras to join the network. The user acting as the administrator can also specify that users must offer camera inputs to join a network i.e. users without cameras are not welcome. This acts to encourage users to set up their own cameras to benefit from other cameras in a community.

Thus the user interface allows users to access and modify data stored in the alert data store 35 and the user data store 24.

Hereinabove, mention has been made to different pricing models for the service offered to users. It will be evident to a skilled person in the art that a wide range of possible pricing models can be used. For example, a unit of cost can be ascribed a monetary value. The various services offered in accordance with embodiments of the present invention can be ascribed varying units of cost. For example, camera monitoring may be ascribed the cost of a fixed unit per month on a subscriber basis. Alternatively, or in addition, a unit of cost can be charged for uploading images to the FTP server. Units of cost can also be charged for units of storage (e.g. a megabyte) for storing images permanently. Further, units of cost can be ascribed to alerts and the cost can be different dependent upon the alert delivery medium. The units of cost can be bought as credits and free credits can be earned as a loyalty bonus. In one embodiment, the service can be offered on a pay as you go basis, whereby a user purchases units of credit to maintain the service or a subscription service can be provided with certain preset "free" credits available to the user under the subscription model.

The user interface provided by the web application 33 can also enable a user to select to interface with cameras and networks via graphical user interface comprising a map image showing the geographic location of cameras that generate the images. The process for providing this capability will now be described with reference to FIGS. 5 to 7.

Figure 5:
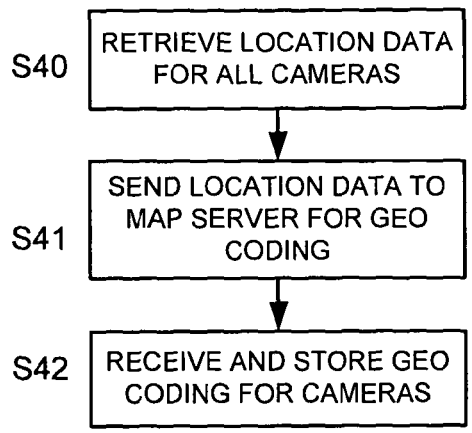
FIG. 5 is a flow diagram illustrating the process for determining geo codes for camera locations.

The camera data for each camera includes a geographic location in the form of a street address. In FIG. 5, in step S40 the location data for all the cameras is retrieved from the user data store 24. This data is sent to the map server 10 in step S41 for the determination of geo-coding for the camera locations. The geo-coding data comprises latitude and longitude data. In this embodiment the map server used is a server hosting the Google map service. In step S42 the geo-coding for the cameras is received from the map server 10 and stored in the user data 24. Thus in this way latitude and longitude location information for each camera is obtained to enable camera locations to be indicated on a Google map.

Figure 6:
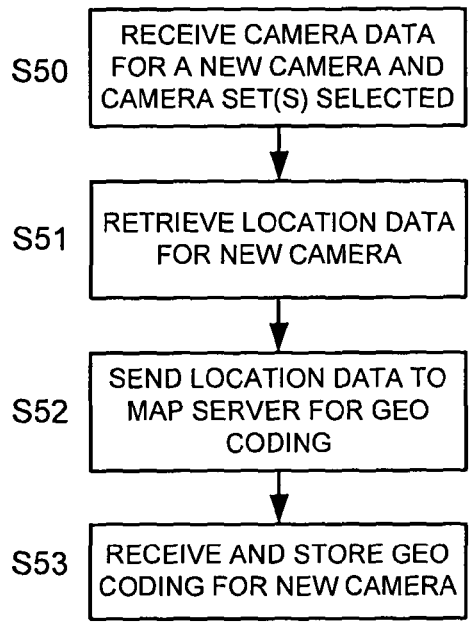
FIG. 6 is a flow diagram illustrating the process for determining geo codes for new cameras.

Referring now to FIG. 6, when a user adds a new camera, new camera location data is entered into the user data store 24 together with a user selection of a camera set or sets to which the camera is to belong i.e. any network that the camera is to belong to (step S50). This location information is retrieved in step S51 and sent to the map server 10 for geo-coding (step S52). The geo-coding for the new camera received from the map server 10 is then stored in step S53. Thus in this way latitude and longitude information for cameras is kept up to date to enable the location of all cameras to be indicated on a map.

Figure 7:
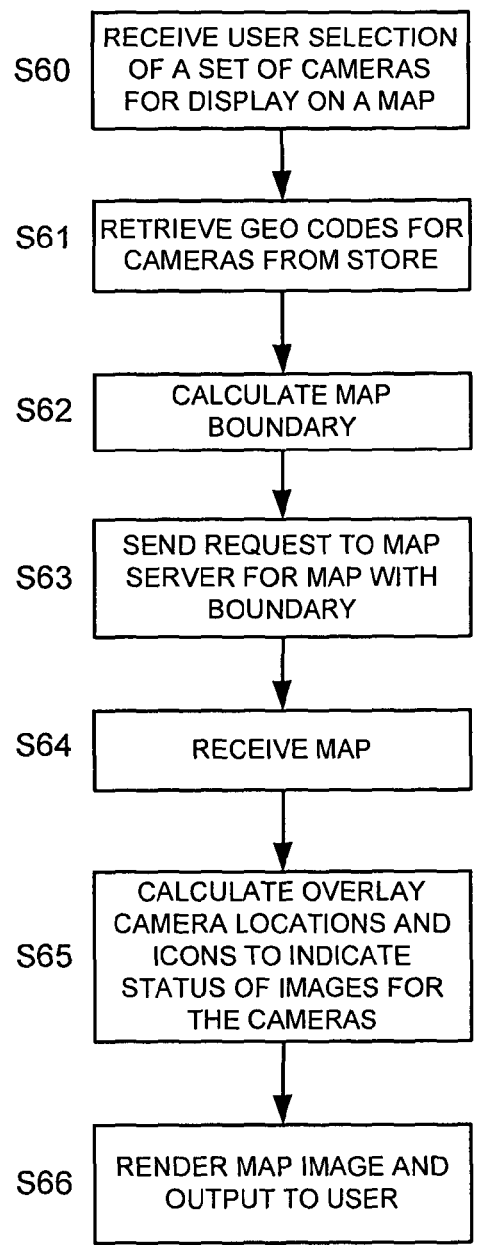
FIG. 7 is a flow diagram illustrating the process for generating a map for a user selected set of cameras.

Referring now to FIG. 7, in step S50 a user selects a network i.e. a set of cameras for display on a map. Geo-codes for the cameras in the network are retrieved from the user data store 24 (step S61). Using the latitude and longitude information a map boundary defining the boundary of the map required to display the location of all cameras is calculated in step S62. The boundary information is sent with a request for map data for the generation of a map to the map server 10 (step S63). A map is returned as map data from the map server 10 (step S64) and the web application 33 then calculates overlay camera location and icons to indicate the status of images for the cameras in step S65. The map is then rendered as an image and output to users in step S66. This process can repeat periodically to update the rendered image based on changes to the camera data, user data and alert data so that the image is kept up to date.

Thus in this method each camera is represented as an icon on the map at the latitude and longitude at which the camera is located. If the location is incorrect, a user can click and drag their camera icon to the correct geographic location on the map. In response to this the application recalculates and updates the geo-code for the camera.

The icon can display the status of the camera and/or the status of images generated by the camera. For example, if there is an alert relating to the camera indicating there are unread images, the icon can display differently e.g. in red on the map. A user can select an icon to view information on the camera e.g. by a single click, or select the camera to view images captured by the camera e.g. by a double click. This of course depends upon the user's permissions granted. The icon can also indicate when a camera is disabled or not responding by being displayed differently for example.

In the embodiment described with reference to FIG. 7, a user selects a network for display of the cameras. In another embodiment the user can select to view all cameras associated with the service e.g. a "world map". In such a view the cameras owned or controlled by the user can be indicated differently on the map and networks to which the user belongs can be indicated differently. For example, cameras belonging to other users can be shown with less detail available. The interface can enable a user to select the camera and request access to images from the camera operated by another user. The request takes the form of a message sent to the other user's inbox. Thus the map provides a graphical user interface method of managing and communicating.

When a network is set up it can be set up with different statuses. It can be set up as a public network, whereby anyone can join automatically and view the images from cameras. It can be set up alternatively as a private network, whereby cameras on the map are indicated differently e.g. with a padlock icon associated with them. Users wishing to join the network can select the camera and request permission to join the network. The request is sent as a message to the administrator's inbox. As another network status it is possible to set up a network as hidden. This status allows either the location of cameras not to be shown to other users, or for non-selectable icons to be shown.

Where cameras are located in close proximity and thus the display of icons on a map would overlap, the application can compress clusters of markers for cameras in close proximity and display a combined cluster marker or icon at the location of the cluster. The statuses of individual cameras for a cluster are thus not shown. However, the user can select a cluster in order to zoom in to show an enlarged map and to show individual locations of cameras which will show statuses of individual cameras.

The statuses of the camera i.e. information such as whether the camera is enabled or disabled, or whether there is an alert i.e. images available from the camera can be periodically updated as well as the location of knew or removed cameras to provide a constantly updated security map with access to security images.

Thus in this embodiment of the present invention, the map provides a graphical user interface to enable for the easy management of a community based surveillance system. A user can belong to many different communities of networks and information can be shared between these communities.

Although in this embodiment the Google Map™ services used in a remote server, the present invention encompasses the use of any type of map service provision either at a remote server, or within the security server.

Alerts generated according to embodiments of the present invention do not have to be received by the camera owner or administrator. The user who owns or controls cameras can set up alerts to be sent to another user.

Although the embodiments of the present invention have been described with primary reference to images, the invention encompasses the capturing of accompanying audio data for association with the image data for playback by the user or other users who are authorised to access the image and audio data.

The network used in the present invention can comprise any suitable wired, wireless or mixed wired and wireless network. In one embodiment the network comprises the Internet enabling the use of Internet Protocol (IP) cameras.

The cameras can be fixed or mobile. Mobile cameras connect to the network wirelessly. Many hand held devices are wireless enabled and include the ability to connect to the internet and hence any such device can comprise a camera in accordance with one embodiment of the invention. Example hand held devices that can include an image capture capability and a wireless network connection are mobile telephones, personal digital assistants (PDAs), tablet computers, games consoles, wireless enabled cameras, and laptop computers. Hence the term camera user in the invention is intended to encompass any user operating or owning an image capture device.

Where mobile or hand held devices are used for capturing images (acting as cameras) the location information for the cameras can be provided from a GPS device in built in the mobile or hand held device or accompanying the device.

Although the present invention has been described with reference to specific embodiments, it will be apparent to a skilled person in the art that modifications lie within the spirit and scope of the present invention.

What is claimed is:

1. A surveillance system comprising:
   receiving means for receiving image data from a plurality of cameras;
   image storage means for storing the received image data identifying each camera from which the image data originated;
   management means for enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras;
   information storage means responsive to said management means for storing camera set data identifying the assigned camera as belonging to said set of cameras, and for storing user data identifying the users authorised to access image data from said set of cameras; and
   image interface means for outputting image data to users dependent upon said camera set data and said user data in said information storage means, wherein said receiving means is adapted to receive said image data comprising at least one image the capture of which by said camera was triggered by an event; the system including image data processing means for processing the image data for said at least one image to identify if said at least one image relates to a previous event, and if said at least one image relates to a previous event, to link said image data to said previous event and to image data identified to belong to the previous event, and if said at least one image is not identified as relating to a previous event, to link the image data to a new event, and wherein said image interface means is adapted to output said image data to said users on an event by event basis.

2. The surveillance system according to claim 1, wherein said management means is adapted to enable camera users to enter camera user data as part of said user data to identify said users as authorised to access image data from said respective cameras.

3. The surveillance system according to claim 1, including alert means for generating an alert for transmission to a user when images are received in said image storage means.

4. The surveillance system according to claim 3, wherein said management means is adapted to enable users owning or operating respective cameras to enter alert data as part of said user data to identify at least one user authorised to access image data from said cameras to receive said alerts for images received for said respective cameras; and said alert means is adapted to generate said alert in dependence upon said alert data in said information storage means.

5. The surveillance system according to claim 1, including alert means for generating an alert for transmission to alert a user of an event, said alert means being adapted to generate an alert signal when said image data is linked to a new event.

6. The surveillance system according to claim 1, including a camera monitoring means for periodically monitoring said cameras to check that a response is received from each said camera.

7. The surveillance system according to claim 6, including camera alert means for generating an alert signal for transmission to alert a user if a camera fails to respond.

8. The surveillance system according to claim 1, wherein said management means is adapted to enable users owning or operating respective cameras to enter camera location data as part of said user data, the system including map means for displaying a map showing the locations of said cameras on said map to said users in dependence upon said camera set data and using said user data.

9. The surveillance system according to claim 8, wherein said map means is adapted to allow a user selection of the location of a said camera, and said image interface means is adapted to output image data to users for a said camera corresponding to a said selected camera location in dependence upon said camera set data and said user data.

10. The surveillance system according to claim 8, wherein said map means is adapted to display the locations of all said cameras, and to display the locations of cameras in a said set of cameras differently to cameras not belonging to said set of cameras in dependence upon said camera set data and said user data.

11. The surveillance system according to claim 8, wherein said map means is adapted to determine a boundary of the map based on the locations of said cameras to be displayed on said map.

12. A surveillance system comprising:
   receiving means for receiving image data from a plurality of cameras;
   image storage means for storing the received image data identifying each camera from which the image data originated;
   management means for enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras, wherein said management means is adapted to enable users owning or operating respective cameras to enter camera location data as part of said user data;

map means for displaying a map showing the locations of said cameras on said map to said users in dependence upon said camera set data and using said user data, wherein said map means is adapted to indicate if there is new image data for each camera at each location, where new image data is image data that has not yet been output by said image interface means;

information storage means responsive to said management means for storing camera set data identifying the assigned camera as belonging to said set of cameras, and for storing user data identifying the users authorised to access image data from said set of cameras; and image interface means for outputting image data to users dependent upon said camera set data and said user data in said information storage means.

13. A surveillance system comprising:

receiving means for receiving image data from a plurality of cameras;

image storage means for storing the received image data identifying each camera from which the image data originated;

management means for enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras, wherein said management means is adapted to enable users owning or operating respective cameras to enter camera location data as part of said user data;

map means for displaying a map showing the locations of said cameras on said map to said users in dependence upon said camera set data and using said user data, wherein said map means is adapted to display a plurality of said camera locations as a single camera cluster location if the locations of said plurality of cameras are within a threshold;

information storage means responsive to said management means for storing camera set data identifying the assigned camera as belonging to said set of cameras, and for storing user data identifying the users authorised to access image data from said set of cameras; and image interface means for outputting image data to users dependent upon said camera set data and said user data in said information storage means.

14. A surveillance method comprising:

receiving image data from a plurality of cameras, wherein said image data comprises at least one image the capture of which was triggered by an event;

storing the received image data identifying each camera from which the image data originated;

enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras;

storing camera set data identifying the assigned camera as belonging to said set of cameras;

storing user data identifying the users authorised to access image data from said set of cameras;

outputting image data to users dependent upon said camera set data and said user data;

processing the image data for said at least one image to identify if said at least one image relates to a previous event, if said at least one image relates to a previous event, linking said image data to said previous event and to image data identified to belong to the previous event, and if said at least one image is not identified as relating to a previous event, linking the image data to a new event, wherein said image data is output to said users on an event by event basis.

15. The surveillance method according to claim 14, including receiving camera user data from camera users as part of said user data to identify said users as authorised to access image data from said respective cameras.

16. The surveillance method according to claim 14, including generating an alert for transmission to a user when images are received in said image storage means.

17. The surveillance method according to claim 16, including receiving alert data as part of said user data from users owning or operating respective cameras to identify at least one user authorised to access image data from said cameras to receive said alerts for images received for said respective cameras; and generating said alert in dependence upon said alert data.

18. The surveillance method according to claim 15, including generating an alert for transmission to alert a user of an event when said image data is linked to a new event.

19. The surveillance method according to claim 14, including periodically monitoring said cameras to check that a response is received from each said camera.

20. The surveillance method according to claim 19, including generating an alert signal for transmission to alert a user if a camera fails to respond.

21. The surveillance method according to claim 14, including receiving camera location data from users owning or operating respective cameras as part of said user data, the method including displaying a map showing the locations of said cameras on said map to said users in dependence upon said camera set data and using said user data.

22. The surveillance method according to claim 21, including receiving a user selection of the location of a said camera, and outputting image data to users for a said camera corresponding to a said selected camera location in dependence upon said camera set data and said user data.

23. The surveillance method according to claim 21 or claim 24, including displaying the locations of all said cameras, and displaying the locations of cameras in a said set of cameras differently to cameras not belonging to said set of cameras in dependence upon said camera set data and said user data.

24. The surveillance method according to claim 21, including determining a boundary of the map based on the locations of said cameras to be displayed on said map.

25. A surveillance method comprising:

receiving image data from a plurality of cameras;

storing the received image data identifying each camera from which the image data originated;

enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras;

storing camera set data identifying the assigned camera as belonging to said set of cameras;

storing user data identifying the users authorised to access image data from said set of cameras;

outputting image data to users dependent upon said camera set data and said user data receiving camera location data from users owning or operating respective cameras as part of said user data;

displaying a map showing the locations of said cameras on said map to said users in dependence upon said camera set data and using said user data; and indicating if there is new image data for each camera at each location, where new image data is image data that has not yet been output.

26. A surveillance method comprising:

receiving image data from a plurality of cameras;

storing the received image data identifying each camera from which the image data originated;

enabling each of a plurality of camera users who own or operate respective cameras to assign a said camera owned or operated by the camera user to at least one said set of cameras and to authorise selected users of the system to access image data from said at least one set of cameras, wherein said users of the system can include camera users and/or users not owning or operating any cameras;

storing camera set data identifying the assigned camera as belonging to said set of cameras;

storing user data identifying the users authorised to access image data from said set of cameras;

outputting image data to users dependent upon said camera set data and said user data;

receiving camera location data from users owning or operating respective cameras as part of said user data;

displaying a map showing the locations of said cameras on said map to said users in dependence upon said camera set data and using said user data; and displaying a plurality of said camera locations as a single camera cluster location if the locations of said plurality of cameras are within a threshold.

27. A non-transient computer-readable storage medium for controlling a computer to carry out the method of claim 14.

\* \* \* \* \*